United States Patent [19]
Tuckey et al.

[11] Patent Number: 5,809,975
[45] Date of Patent: Sep. 22, 1998

[54] IN TANK FUEL PUMP AND RESERVOIR WITH STAND PIPE

[75] Inventors: Charles H. Tuckey, Sand Point, Mich.; David E. Mroczka, Cromwell; Laurie J. Swanson, Waterford, both of Conn.

[73] Assignee: Walbro Corporation, Cass City, Mich.

[21] Appl. No.: 891,628

[22] Filed: Jul. 9, 1997

Related U.S. Application Data

[63] Continuation-in-part of Ser. No. 643,634, May 6, 1996, Pat. No. 5,647,329.

[51] Int. Cl.⁶ .................................................. F02M 37/04
[52] U.S. Cl. ........................................... 123/509; 123/514
[58] Field of Search ..................................... 123/509, 514, 123/516

[56] References Cited

U.S. PATENT DOCUMENTS

| | | | |
|---|---|---|---|
| 4,697,995 | 10/1987 | Tuckey | 418/15 |
| 4,747,388 | 5/1988 | Tuckey | 123/514 |
| 4,807,582 | 2/1989 | Tuckey | 123/514 |
| 4,831,990 | 5/1989 | Tuckey | 123/514 |
| 4,869,225 | 9/1989 | Nagata et al. | 123/514 |
| 4,893,593 | 1/1990 | Sejimo et al. | 123/187 |
| 4,893,647 | 1/1990 | Tuckey | 123/514 |
| 4,964,787 | 10/1990 | Hoover | 417/363 |
| 5,050,567 | 9/1991 | Suzuki | 123/514 |
| 5,146,901 | 9/1992 | Jones | 123/514 |
| 5,257,916 | 11/1993 | Tuckey | 417/423 |
| 5,456,235 | 10/1995 | Porter | 123/514 |

*Primary Examiner*—Thomas N. Moulis
*Attorney, Agent, or Firm*—Barnes, Kisselle, Raisch, Choate, Whittemore & Hulbert, P.C.

[57] ABSTRACT

For a fuel pump mounted within a module in a vehicle fuel tank, a stand pipe is provided in communication at its upper end with a return fuel reservoir and at its lower end with the inlet of the fuel pump to deliver fuel from the return fuel reservoir when the level of fuel in the reservoir rises above the upper end of the stand pipe. The return fuel reservoir has an inlet in communication with a fuel return line through which excess fuel in the fuel system is delivered to the return fuel reservoir. This "weathered" return fuel is delivered to the fuel pump inlet through the stand pipe when the level of fuel in the reservoir is sufficiently high to prefer use of the weathered return fuel by the fuel pump.

8 Claims, 2 Drawing Sheets

IN TANK FUEL PUMP AND RESERVOIR WITH STAND PIPE

COPENDENCY BENEFIT APPLICATIONS

This application is a continuation-in-part of U.S. application Ser. No. 08/643,634, filed May 6, 1996, now U.S. Pat. No. 5,647,329.

FIELD OF THE INVENTION

This invention relates to vehicle fuel systems and more particularly to an electric fuel pump and reservoir disposed in a main fuel tank of a vehicle.

BACKGROUND OF THE INVENTION

Modem fuel delivery systems for automotive vehicles with engines having fuel injectors have utilized an electrically driven fuel pump in the vehicle main fuel tank. Typically, the electric fuel pump is mounted either directly in the vehicle tank, or is mounted within a reservoir canister received in the tank as shown, for example, in U.S. Pat. Nos. 4,747,388; 4,807,582; 4,831,990; 4,893,647; and 4,964,787. The canister reservoir supplies fuel to the pump in the event there is an interruption in the availability of fuel from the tank, such as when, under low fuel level conditions, cornering of the vehicle causes sloshing or movement of the fuel away from the pump inlet and to one side or the other of the tank, or when the tank is excessively tilted by vehicle inclination on severe grades, or when essentially all the fuel in the main tank has been consumed. Typically, the output of the fuel pump is greater than that required by the vehicle engine and the excess fuel is either returned from the fuel injectors to the tank or to the in-tank canister reservoir.

Typically, in a no-return fuel system, there is only one fuel supply line between the fuel pump and an engine fuel rail or manifold distributing fuel to the individual fuel injectors, and downstream of the fuel injectors there is no line returning unused fuel from the rail or manifold to the fuel tank. In such no-return fuel systems excess fuel is bypassed directly to the tank or canister reservoir, typically by a pressure regulator usually located closely downstream of the pump outlet within the tank or canister.

Especially with turbine vane fuel pumps, it is important to limit the vapor intake of the fuel pump because turbine vane fuel pumps do not sufficiently purge themselves of vapor under adverse temperature or other vapor generating conditions. Returning fuel from the hot fuel rail to the fuel pump module or into the bulk of fuel in the fuel tank will generate vapor due to the increased heat of the return fuel and the mixing of the return fuel with the bulk of fuel in the tank. This is undesirable because of the adverse impact of the fuel vapor on the operation of the fuel pump.

Further, the fuel returned from adjacent the engine has been heated and the portion of the fuel which more readily vaporizes has been vaporized and thus, has been removed from the fuel. Therefore, it is desirable to draw this return fuel into the fuel pump due to its reduced vapor content. Prior fuel systems do not provide for maintaining the return fuel in a separate reservoir and also preferentially delivering that fuel to the fuel pump.

SUMMARY OF THE INVENTION

For a fuel pump mounted within a module in a vehicle fuel tank, a stand pipe is provided in communication at its upper end with a return fuel reservoir and at its lower end with the inlet of the fuel pump to allow some of the fuel within the return fuel reservoir to flow to the fuel pump inlet when the level of fuel in the reservoir rises above the upper end of the stand pipe. The return fuel reservoir has an inlet in communication with a fuel return line through which excess fuel in the fuel system is delivered to the return fuel reservoir. This "weathered" return fuel is delivered to the fuel pump inlet through the stand pipe when the level of fuel in the reservoir is sufficiently high so that this weathered fuel is supplied by the fuel pump to the engine.

Returning the weathered fuel to the reservoir separates this return fuel, which is often heated as a result of being passed in close proximity to the engine, from the bulk of fuel in the fuel tank to limit the generation of vapor in the fuel system. Further, the weathered fuel as a direct result of being heated, agitated and subjected to pressurizing and depressurizing cycles within the fuel system has a low vapor content and has been conditioned such that the portion of the fuel which tends to vaporize more rapidly has been effectively removed as the fuel previously passed through the various portions of the fuel system. Thus, drawing the weathered fuel through the fuel pump is preferred to limit the vapor ingestion of the fuel pump in use.

In diesel applications, the ingestion of the weathered fuel by the fuel pump has an additional benefit of inhibiting wax formation on the fuel filter. This is accomplished because the return flow is heated as a result of being routed in close proximity to the engine before being returned to the reservoir. This heated return fuel flow inhibits filter clogging due to waxing of the diesel fuel in cold conditions.

Objects, features and advantages of this invention include providing a system that reduces the vapor ingestion of the fuel pump in use, prefers weathered fuel over bulk fuel in the fuel tank, maintains a supply of fuel in communication with the fuel pump inlet even during extremely low fuel level conditions in the fuel tank, maintains the heated return fuel flow separate from the bulk of fuel in the fuel tank to limit vapor production within the fuel system, inhibits wax formation on the fuel filter in diesel applications, is of relatively simple design and economical manufacture and assembly, improves the performance and efficiency of the fuel pump and in service, has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTIONS

Figure 1:
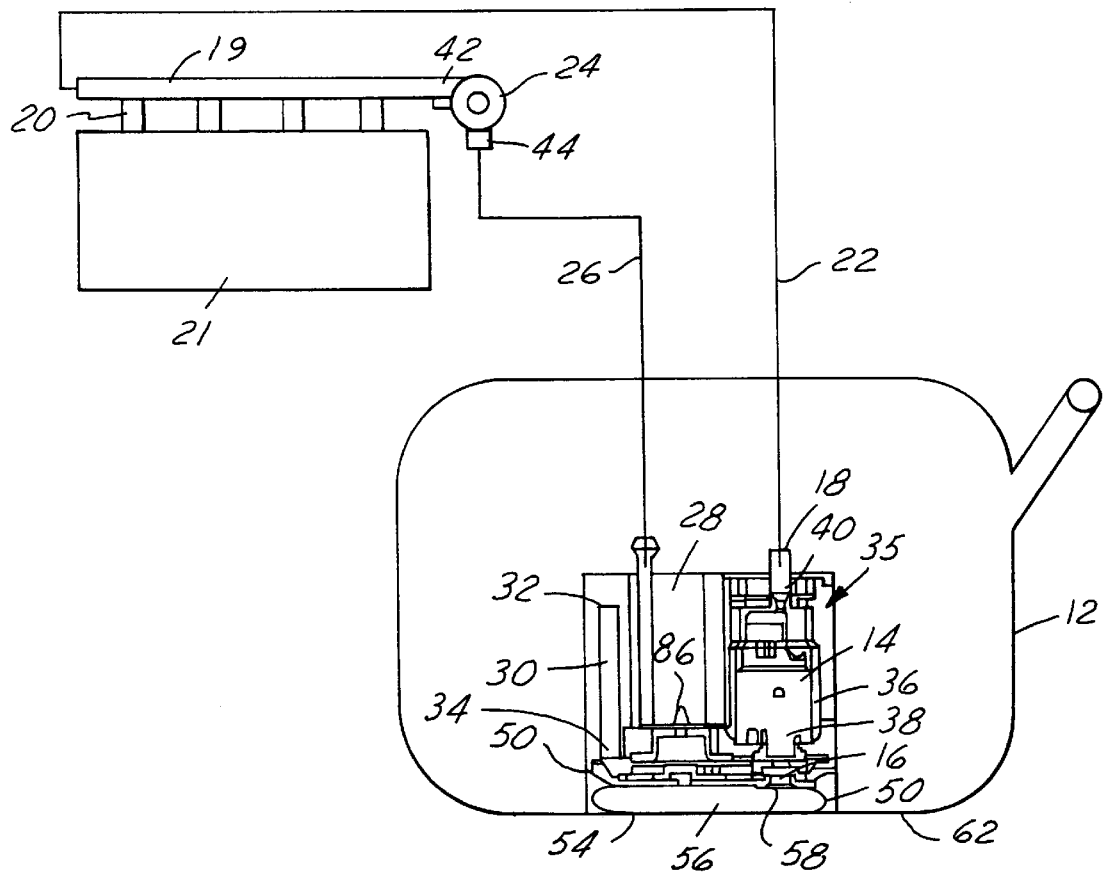
FIG. 1 is a diagrammatic view of a fuel system embodying this invention.

As shown in FIG. 1, a fuel pump module 10 is disposed within a fuel tank 12 of a vehicle fuel system and has an electric fuel pump 14 with an inlet 16 into which fuel is drawn and an outlet 18 through which fuel is delivered under pressure to a fuel rail 19 and injectors 20 of an engine 21 through a conduit 22. A fuel pressure regulator 24 downstream of the fuel injectors 20 and typically mounted on the rail 19 bypasses excess fuel from the rail to a return fuel line 26 which communicates at its opposite end with a return fuel reservoir 28 defined by the module 10. A stand pipe 30 in the return fuel reservoir 28 has an open upper end 32 in communication with the interior of the return fuel reservoir 28 and an open lower end 34 in communication with the fuel pump inlet 16 so that under at least certain fuel level conditions in the return fuel reservoir 28 fuel therein may flow through the stand pipe 30 to be drawn into the fuel pump 14.

Figure 3:
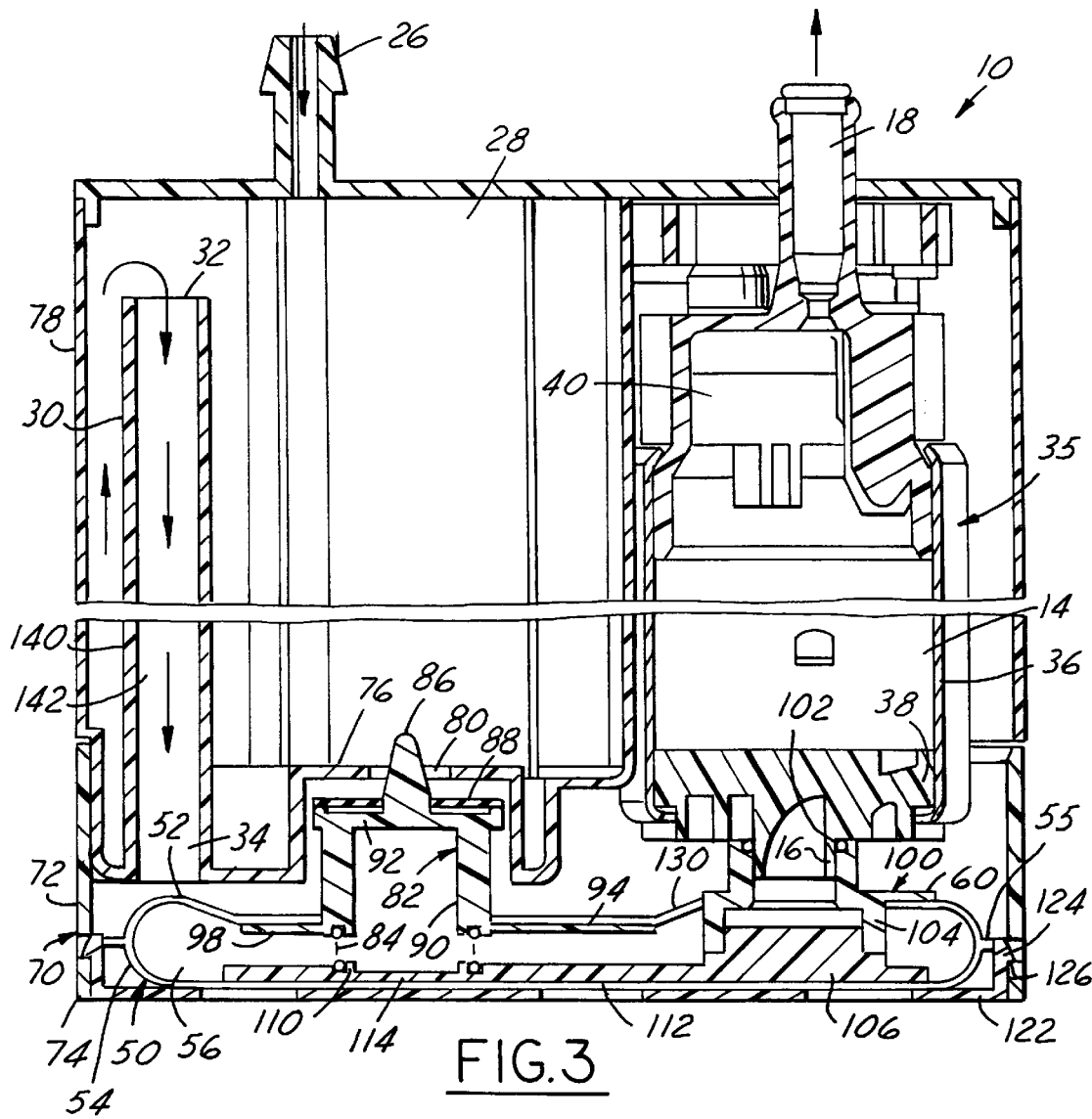
FIG. 3 is a sectional view of a fuel pump module embodying this invention.

The fuel pump 14 has a pump assembly 35 driven by an electric motor both of which are sealed in a cylindrical housing 36 with a bottom inlet end cap 38 and top outlet end cap 40 (see also FIG. 3). The pump is preferably a turbine type pump but alternatively it may be a positive displacement type pump. A suitable positive displacement gear rotor type electric fuel pump is disclosed in U.S. Pat. No. 4,697,995, and a suitable turbine regenerative fuel pump is shown in U.S. Pat. No. 5,257,916, the disclosures of which are incorporated herein by reference and hence the pump 14 will not be described in further detail. However, it is to be noted that each of these patents disclose rotary pumps with a built-in vapor purging system to allow purging of vapor from the pump to enable the pump to be self-priming and to pump against a pressurized fuel line under hot fuel conditions.

In normal operation, the fuel pump 14 may operate at a constant speed and supply a greater quantity of fuel than is needed even to meet the maximum demand of the operating engine 21. The pressure regulator 24 has an inlet 42 connected to the fuel rail preferably disposed downstream of the fuel injectors 20 and maintains a substantially constant pressure of fuel supplied to the engine injectors by bypassing or discharging excess fuel through its bypass outlet 44 to the return fuel line 26 connected to the return fuel reservoir 28. The flow rate of the excess fuel is inverse to the flow rate or quantity of fuel consumed by the engine. Typically, the pressure regulator 24 has a fuel flow rate control valve actuated by a diaphragm in response to changing fuel demand of the engine 21 to maintain a substantially constant output pressure. Typically, the regulator 24 will maintain a substantially constant output pressure, such as 50 psig, with a pressure drop of about 1 to 3 psi over the full range of variation of the fuel flow rate to the engine from 0 to 40 gallons per hour. A suitable pressure regulator 24 is disclosed in U.S. Pat. No. 5,220,941 the disclosure of which is incorporated herein by reference and hence, the pressure regulator 24 will not be described in greater detail.

Alternatively, a fuel pressure regulator may be disposed within the fuel tank 12 and adjacent the fuel pump outlet 18 to regulate the pressure of fuel delivered to the engine 21. The bypass outlet of this regulator would communicate excess fuel directly with the return fuel reservoir 28.

The fuel pump module 10 is preferably mounted and suspended in a conventional manner within the fuel tank 12 so as to be of the bottom seeking type, and adapted dimensionally for a drop-in installation through an opening in the top wall of the fuel tank 12 to rest on its base on the bottom wall 62 of the fuel tank 12 or the bottom wall of a swirl pot basin disposed in the fuel tank 12.

A base portion 70 of the module 10 has an integrally molded cylindrical wall portion 72 provided with three or four circumferentially spaced apart stand off feet 74 protruding downwardly from its lower edge providing a cavity to receive a filter assembly 50. The return fuel reservoir 28 is defined by a bottom or septum wall 76 and is generally "C"-shaped in horizontal cross section. The side wall of 78 of the reservoir is generally cylindrical through about 270° of its circumference and then is indented to provide nesting space for the cylindrical fuel pump housing 36. The fuel pump outlet 18 protrudes above the upper end of the fuel pump housing 36.

Figure 4:
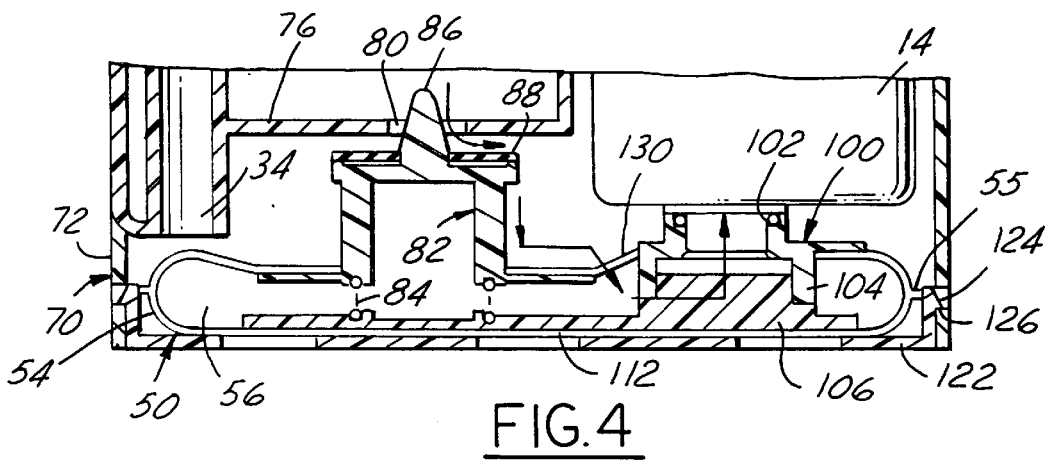
FIG. 4 is a fragmentary sectional view of the lower portion of the fuel pump module of FIG. 1 illustrating the reserve fuel canister valve in an open position.

As shown in FIGS. 3 and 4, the fuel filter assembly 50 has a bag or envelope formed from an upper wall 52 and a lower wall 54 of a flexible filter material of a fine mesh, such as a plastic material, which are heat sealed together around their peripheries 55. The interior chamber 56 of the envelope communicates through an outlet 58 with the inlet 16 of the pump 14 into which it is slidably received and frictionally retained with an interference fit. Preferably, the outlet 58 is a ring made of a plastic material and has a peripheral flange 60 secured and sealed, such as by a heat seal to the upper wall 52 of the filter material. In use, the fuel filter 50 and the fuel pump inlet 16 lie closely adjacent to the bottom of the fuel tank 12, and preferably the lower wall 54 of the fuel filter 50 lies adjacent the bottom wall 62 of the lowermost portion of the fuel tank 12 (e.g., within a tank swirl pot). For this purpose the fuel pump module 10 is preferably vertically movably supported from a conventional tank top mounting flange (not shown) on a suitable conventional telescopic type support fixture (not shown) so as to be gravitationally biased, and also, if desired, spring biased and pressurized outlet hose biased, downwardly as a "bottom-seeking" type fuel pump module.

The return fuel reservoir 28 has an outlet 80 provided in the septum wall 76 of the return fuel reservoir 28. To close the outlet 80, a valve member 82 is carried by the upper wall 52 of filter material and yieldably biased by a spring 84 to insert a valve head 86 into the outlet 80 and sealingly engage a valve disc 88 against the septum wall 76 to close the outlet 80. The valve member 82 has an imperforate cylindrical skirt wall 90 integrally joined to an upper wall 92 from which the valve head protrudes. An encircling portion of the filter upper wall 52 is embedment molded in the lower edge of the skirt wall 90. A wagon-wheel-type fabric support 94 has a circular rim 96 (FIG. 2) integrally connected to the skirt wall 90 by four spokes 98 spaced at 90° increments from one another. Wagon wheel 94 is either adhesively affixed to the undersurface of the filter upper wall 52 or embedment molded therewith.

The filter upper wall 52 also has a pump inlet attachment grommet 100 carrying an O-ring 102 and press fit on the fuel pump inlet 16. The filter upper wall 52 is also sealably secured to the grommet 100, as by embedment molding in the shoulder wall thereof. The grommet 100 has three equally annular spaced dependent spacer legs 104 which telescopically receive therein with a press fit the reduced diameter head of a modified lower spacer post 106. Preferably, the lower filter wall 54 is embedment molded into the spacer post 106. The upper face of the spacer post 106 is spaced below the fuel pump inlet 16 so that the inlet 16 is open to fuel flow from the interior of the filter chamber 56 between the three spacer legs 104.

Figure 2:
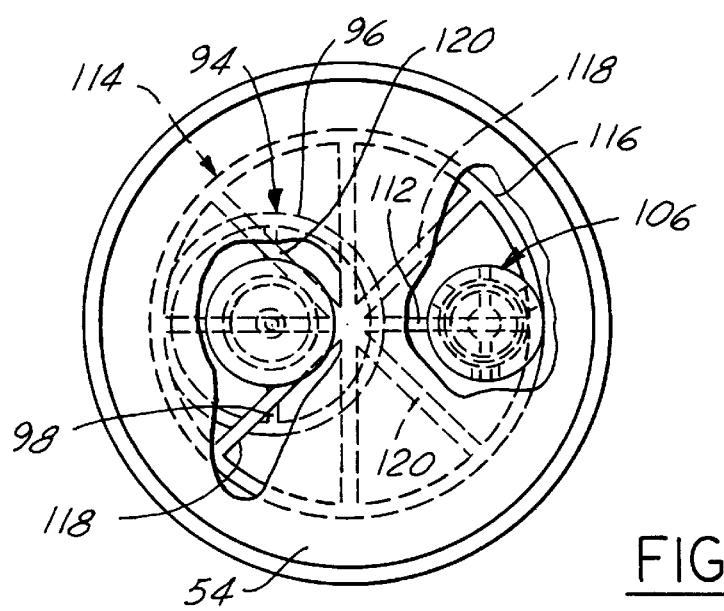
FIG. 2 is a bottom plan view of a filter subassembly of the fuel pump module of this invention.

As shown in FIGS. 2 and 4, a lower spring keeper boss 110 is integrally joined by a center spoke 112 of a wagon-wheel-type filter retainer 114 to a spacer post 106. The retainer 114 has a circular rim 116 integrally joined at a tangent junction with the outer edge of the spacer post 106. The retainer 114 also has two additional diametrically spokes 118 and 120 extending perpendicular to one another and oriented at 45° to the center spoke 112. The spring keeper boss 110 is integrally joined to a left hand portion of the spokes 118, 120 as well as the left hand extremity of center spoke 112 which leads out to rim 116 as viewed in FIG. 2. Preferably the retainer 114, spring keeper boss 110 and the lower spacer post 106 are integrally molded from plastic as a one-piece part, with the filter lower wall 54 embedment molded therewith. A retainer 122 is received adjacent the spring keeper boss 110 and held in place by locking tabs 124 received in slots 126 formed in the pump module base portion 70.

The wagon wheel retainer 114 operates to hold down the filter lower wall 54 held down against the retainer 122 even when pump suction is effective to draw the filter upper wall 52 downwardly against the yieldable bias of the compression spring 84. When the valve member 82 is thereby moved downwardly to open the reservoir outlet 80 the fuel in the reservoir 28 can flow downwardly adjacent the skirt wall 90 and onto and through the filter upper wall 52, into the interior filter chamber 56. It will be seen that the retainer 114 allows substantially unimpeded flow of fuel upwardly through the filter lower wall 54 and to the interior filter chamber 56 while preventing the filter lower wall 54 from collapsing upwardly under reserve fuel draw conditions.

Likewise, the upper sheet wagon wheel retainer 94 allows substantially unimpeded flow of fuel downwardly through the filter upper wall 52 and into the filter chamber 56. The retainer 94 also cooperates with the bellows-like annular flexing portion 130 of the filter upper wall 52 surrounding the retainer 94 to provide a sensitive and vertically movable diaphragm construction for controlling the opening and closing of valve member 82.

In accordance with the present invention the return fuel reservoir 28 has a stand pipe 30 received therein through which fuel in the reservoir 28 may flow out of the reservoir 28 to be supplied to the inlet 16 of the fuel pump 14. The stand pipe 30 preferably has a tubular sidewall 140 defining a passage 142 communicating the open upper end 32, which communicates with the interior of the return fuel reservoir 28, with an open lower end 34 which communicates with the exterior of the reservoir 28 preferably through the septum wall 76 adjacent the pump module base portion 70. The upper end 32 of the stand pipe 30 preferably communicates generally adjacent the upper most portion of the interior of the reservoir 28 so that a sufficient volume of fuel can be maintained in the reservoir 28 to adequately supply fuel to the fuel pump 14 for at least a short duration when fuel from the main tank 26 is absent at the fuel pump inlet 16 and the valve member 82 is moved to open the outlet 80 of the reservoir 28.

In use, excess fuel is returned to the return fuel reservoir 28 through the return fuel line 26 communicating the fuel pressure regulator 24 downstream of the fuel pump outlet 18 with the return fuel reservoir 28. When the level of fuel in the return fuel reservoir 28 rises above the upper end 32 of the stand pipe 30, fuel flows through the stand pipe passage 142, into the fuel pump module base portion 70, through a filter wall 52 or 54 and into the main filter chamber 56 before being drawn into the fuel pump 14.

It is desirable to draw the return fuel into the fuel pump 14 because much of the vapor previously in that fuel was removed as it passed through the fuel pump 14 and other components of the fuel system and was subjected to being heated, agitated and pressurized. In return type fuel systems this return fuel is also heated by the operating engine 21. Also, the return fuel was filtered at least once before it was drawn into the fuel pump 14 and may be filtered again after leaving the stand pipe 30 and before entering the fuel pump 14 providing generally cleaner fuel that has been filtered at least twice. Further, returning fuel to the return fuel reservoir 28 which is separate from the bulk of fuel in the fuel tank 12 avoids the production of fuel vapor associated with returning hot fuel under pressure to the cooler fuel in the fuel tank as occurs in other return fuel systems which return fuel directly to the fuel tank. Thus, less fuel vapor is generated in the fuel system and drawn through the fuel pump 14 improving the performance and efficiency of the fuel pump 14 and the fuel system.

We claim:

1. A fuel pump module constructed to be disposed in a vehicle fuel tank comprising:

a housing constructed to be disposed in the fuel tank;

a fuel reservoir defined by the housing;

an electric motor fuel pump carried by the housing within the fuel tank and outside of the fuel reservoir and having a fuel inlet through which fuel is drawn and a fuel outlet through which fuel is supplied to a fuel line under pressure;

a return fuel line in communication with the fuel system downstream of the fuel pump at one end and with the fuel reservoir at its other end to return excess fuel delivered from the fuel pump to the fuel reservoir;

a stand pipe having an upper end in communication with the interior of the fuel reservoir and having a lower end in communication with the upper end and with the exterior of the fuel reservoir whereby when the level of fuel in the fuel reservoir is above the height of the upper end of the stand pipe fuel flows through the stand pipe to the exterior of the fuel reservoir and to the inlet of the fuel pump whereupon it may be drawn into the fuel pump through the fuel inlet.

2. The fuel pump module of claim 1 wherein the lower end of the stand pipe is disposed adjacent to the fuel pump inlet so that fuel which flows through the stand pipe may be drawn into the fuel pump inlet.

3. The fuel pump module of claim 1 which also comprises a filter bag defining an enclosure and the fuel pump inlet communicates with the enclosure to draw fuel through a portion of the filter and into the fuel pump.

4. The fuel pump module of claim 3 wherein the lower end of the stand pipe communicates with the exterior of the filter bag such that the fuel which flows through the stand pipe flows into and through the filter bag before entering the fuel pump to again filter that fuel.

5. The fuel pump module of claim 1 which also comprises an opening in the fuel reservoir selectively communicated with the exterior of the reservoir by a valve opened when fuel is absent adjacent the fuel pump inlet to provide a reserve fuel supply in the reservoir to the fuel pump inlet.

6. The fuel pump module of claim 1 wherein excess fuel supplied to the engine is returned to the fuel reservoir.

7. The fuel pump module of claim 1 also comprising a fuel pressure regulator adjacent the fuel pump outlet which bypasses excess fuel delivered from the fuel pump to the fuel reservoir.

8. The fuel pump module of claim 1 wherein the fuel reservoir is constructed to contain only fuel returned thereto through the return fuel line.

* * * * *